(12) United States Patent
Born et al.

(10) Patent No.: US 8,559,495 B2
(45) Date of Patent: Oct. 15, 2013

(54) EQUALIZER ADAPTATION

(75) Inventors: Chris Born, Bristol (GB); Miguel Marquina, Bristol (GB); Ben Willcocks, Bristol (GB); Andrew Sharratt, Bristol (GB); Allard Van Der Horst, Monmouthshire (GB)

(73) Assignee: Phyworks Limited, Bristol (GB)

( * ) Notice: Subject to any disclaimer, the term of this patent is extended or adjusted under 35 U.S.C. 154(b) by 562 days.

(21) Appl. No.: 12/825,025

(22) Filed: Jun. 28, 2010

(65) Prior Publication Data

US 2011/0317752 A1  Dec. 29, 2011

(51) Int. Cl.
*H03K 5/159* (2006.01)
(52) U.S. Cl.
USPC ........... 375/232; 375/229; 375/230; 375/233; 375/236
(58) Field of Classification Search
CPC ................. H04L 25/03057; H04L 25/03063; H04L 25/0307; H04L 25/03146; H04L 25/03082; H04L 25/03089; H04L 25/03095; H04L 25/03101; H04L 25/031
USPC .................................. 375/229–234
See application file for complete search history.

(56) References Cited

U.S. PATENT DOCUMENTS

| | | | |
|---|---|---|---|
| 7,088,793 B1 * | 8/2006 | Mickelson et al. | 375/341 |
| 7,170,930 B2 * | 1/2007 | Denny et al. | 375/229 |
| 7,492,845 B2 * | 2/2009 | Chou et al. | 375/350 |
| 7,760,798 B2 * | 7/2010 | Hidaka | 375/232 |
| 7,817,757 B2 * | 10/2010 | Hidaka | 375/350 |
| 2003/0063664 A1 | 4/2003 | Bodenschatz | |
| 2005/0201455 A1 * | 9/2005 | Wilson | 375/232 |
| 2006/0200511 A1 | 9/2006 | Park et al. | |
| 2009/0016423 A1 * | 1/2009 | Semjonov | 375/233 |

FOREIGN PATENT DOCUMENTS

| | | | |
|---|---|---|---|
| EP | 1156634 A1 | 11/2001 | |
| EP | 1331777 A1 | 7/2003 | |

* cited by examiner

*Primary Examiner* — Sophia Vlahos
(74) *Attorney, Agent, or Firm* — TIPS Group

(57) ABSTRACT

This invention relates to methods and apparatus for equalizer adaptation for compensating for channel distortion on received data signals. The method comprises, for each bit, forming an adjusted bit signal comprising a weighted contribution from at least one other bit period. The polarity of the adjusted bit signal is determined and the bit is categorized as a hard, i.e. high confidence, bit is the bit is above an upper threshold or below a lower threshold or otherwise is categorized as a soft bit. The weightings are adjusted based on the category of the bit wherein a first adjustment is made it the bit is categorized as a soft bit but a second, different adjustment is made if the bit is categorized as a hard bit. For a soft bit the weightings may be increased for bits which have the same polarity as the bit in question and decreased for bits of opposite polarity. For a hard bit the adjustment may increase the weighting for bits of opposite polarity and decrease the weighting for bits of the same polarity as the bit in question. The adjustments for the hard and soft bits may be weighted differently according to the proportion of soft to hard bits.

15 Claims, 3 Drawing Sheets

EQUALIZER ADAPTATION

The present invention relates to methods of equalizer adaptation and to adaptive equalizers for compensating for signal distortion introduced by a communications channel.

In a conventional binary, serial data link between a transmitter and a receiver each 'bit' of information is encoded by the transmitter as the polarity of the signal. Depending on the nature of the transmitter and the receiver the signal which is transmitted may, for instance, be an electrical signal or optical signal and the signal may be transmitted via any suitable channel, for example via free space or via a suitable guide medium such as a conductive wire or fibre optic cable. The data is transmitted at a fixed rate, with each data bit occupying a period of time equal to the bit period. The receiver is required to determine the polarity of each bit received in order to correctly recover the data sequence. A simple receiver will have a single threshold placed half way between the average '1' level and the average '0' level. The input signal will be sampled at the middle of each bit period to recover the data.

One source of signal corruption in the receiver is noise. This adds a random component to the received signal which will cause errors in the received signal if it is large enough to cause the received signal to be on the wrong side of the decision threshold when the signal is sampled.

A second source of signal corruption is intersymbol interference (ISI). The channel that the signal is transmitted through can cause the energy in one bit period to spread into other bit periods. ISI can be characterised in terms of the impulse response of the channel. A channel will introduce significant ISI if the impulse response contains significant energy greater than $+/- \frac{1}{2}$ a bit period from the main peak. ISI means that the amplitude of the signal at the sampling point is no longer dependent only on the polarity of the current bit, but also on the sequence of bits before and after the current bit. Bit sequences which cause the signal to have a smaller amplitude at the sampling point will increase the probability of errors occurring in receiver. In extreme cases, ISI can cause errors in the received signal even in the absence of noise.

In order to minimise the impact of ISI on the error rate, an equaliser can be used to cancel out the effect of it. A common type of equaliser is the Feed Forward Equalizer/Decision Feedback Equalizer (FFE/DFE) as shown in FIG. 1.

The FFE cancels out precursive ISI, that is energy which has spread from bits which were transmitted after the bit currently being sampled. The analogue signal received at the receiver/equalizer input is sampled and this input signal 101 is passed through a tapped delay line, comprising a series of taps 102 and delays 103 clocked at the bit rate. The output from each tap 102 is input to a multiplier 104 which multiplies the output by an appropriate gain (Wn1, Wn2) for that tap. The gain adjusted outputs from all the taps are then input to a summation block 105. An N bit FFE can null precursive ISI which spreads up to N bits before the main peak. The tap coefficients Wn1 to WnN are adjusted to achieve this nulling. A negative tap coefficient, Wnx, is required to compensate for an impulse response which has a positive polarity x bit periods from the main peak and vice versa.

The DFE cancels out postcursive ISI, that is energy which has spread from bits which were transmitted before the bit currently being sampled. The quantised output data 106 is fed back through a second tapped delay line, consisting of taps 107 and delays 108, clocked at the bit rate. The quantised output of each tap passes via a multiplier 109, where an appropriate gain (Wp1, Wp2) is applied, before being input into the summation block 105. An M bit DFE can null precursive ISI which spreads up to M bits after the main peak. The coefficients Wp1 to WpM are adjusted to achieve this nulling.

It is also possible to correct for postcursive ISI using by extending the FFE, rather than using a DFE.

The output from the summation block 105 is input to a comparator 110 where it is compared to a threshold level to decide whether the current bit represents a '1' or a '0'. The output of comparator 110 provides the quantized output signal 106 which has been equalized for channel distortion.

In order for the equaliser to correct for the ISI, the tap coefficients must be set appropriately for the channel. Some communication standards involve a training period during which the transmitter sends a predefined data sequence to the receiver in order to train the equaliser. However many communication standards, such as Fibre Channel and 10G Ethernet for example, do not allow for such a training period. The equaliser must therefore be trained on live data.

A simple and robust method which can be used to adapt an FFE/DFE using live data is described in U.S. Pat. No. 7,170,930 and also illustrated in FIG. 1. The method uses two extra comparators, 111, 112 in addition to the main data comparator 110. Comparator 111 compares the output of the summation block 105 with an upper threshold. The upper threshold is somewhat higher than the slicing threshold, i.e. the threshold for the main data comparator 110. Comparator 112 compares the output of the summation block 105 with a lower threshold, which is lower than the slicing threshold. The slicing threshold is placed midway between the upper and lower thresholds. Using all three comparators, each received bit can be categorised by control logic 113, as follows:

Hard 1—Above slice and upper thresholds;
Soft 1—Above slice threshold but below upper threshold;
Soft 0—Below slice threshold but above lower threshold;
Hard 0—Below slice and lower thresholds.

FIG. 2 illustrates the relationship of the threshold and the bit categories.

The upper and lower thresholds are adjusted so that a certain percentage of bits are determined to be soft bits. The control logic 113 makes a small change to each tap weight each time a soft bit is received, i.e. where the output from summation block 105 for the current bit under consideration is characterised as either a soft 1 or a soft 0. If the bit x bits after the soft bit has the same polarity as the soft bit, then an amount, a, is added to relevant coefficient Wnx. If it has the opposite polarity, then the amount a is subtracted from the relevant coefficient Wnx. This change in gain coefficient will make subsequent bit sequences where bit x has the same polarity relative to the current bit less likely to cause a soft decision.

The value of the amount, a, by which the tap coefficients are changed determines the rate at which the FFE tap coefficients settle. When implementing the algorithm, these changes may be filtered before being applied to reduce the amount of dithering of the thresholds. A steady state is reached for a particular coefficient Wnx when the rate at which soft bits with the same polarity as bit x occur is the same as the rate at which soft bits with the opposite polarity occur. The method decorrelates the sampled bit from surrounding bits.

The same method may be used to adjust the DFE coefficients Wpy, with an adjustment amount b. The value of adjustment amount b may be different to a, so that the FFE and DFE adapt at different rates.

The method described above works very well with live data in many communication protocols. However the inventors of the present application have found that this method may not work optimally when used with some communication protocols.

Thus, in one aspect of the invention, there is provided a method of equalizing a received data signal comprising a series of bits, the method comprising:

forming an adjusted bit signal for a bit based on the signal received for the relevant bit period and at least one weighted contribution from another bit period;

comparing the value of the adjusted bit signal to a slice threshold to determine the polarity of the adjusted bit;

categorizing the bit as a hard bit if the adjusted bit has a signal value above an upper threshold or below a lower threshold and otherwise as a soft bit, wherein the upper threshold is above the slice threshold and the low threshold is below the slice threshold, and adjusting the weighting for said at least one weighted contribution from another bit period; wherein a first adjustment to a weighting is made if the adjusted bit signal is categorized as a soft bit and a second, different adjustment is made if the adjusted bit signal is categorized as a hard bit.

The method of the present invention therefore, for each bit of the received data signal in turn, forms an adjusted bit signal comprising the signal from the relevant bit period and weighted contributions for one or more other bits periods in a similar fashion as described above. This adjusted bit signal is compared to a slice threshold to determine the polarity, i.e. whether it is a binary 1 or a binary 0, and the bit is also categorized as a hard bit or a soft bit by comparing it to an upper and a lower threshold, the upper threshold being above the slice threshold and the lower threshold being below the lower threshold. Thus similarly to the method described in U.S. Pat. No. 7,170,930, the contents of which is hereby incorporated by reference thereto, the method of the present invention determines not only the polarity of the bit but also a degree of confidence in the bit.

If the bit is a soft bit then an adjustment to the weightings applied to the contributions from other bits periods is made. In the present invention however an adjustment is also made if the bit is categorized as a hard bit.

In one embodiment the adjustment made if a soft bit is detected, i.e. the first adjustment, comprises increasing the weighting for a bit period in which the signal matches the polarity of the adjusted bit signal and decreasing the weighting for a bit period in which the signal has the opposite polarity to the adjusted bit signal. Again this is similar to the method described in U.S. Pat. No. 7,170,930 and will result in a change to the weightings that would increase the confidence level of the bit in question.

The second adjustment, made when a hard bit is detected, comprises decreasing the weighting for a bit period in which the signal matches the polarity of the adjusted bit signal and increasing the weighting for a bit period in which the signal has the opposite polarity to the adjusted bit signal. This is effect decreases the confidence level in the relevant bit.

The method of the present invention is therefore counter-intuitive but has particular advantage in that is allows use with various different types of data communication in which the distribution of bits may not be random.

The method described in U.S. Pat. No. 7,170,930 nulls the ISI within the tap range of the equaliser for random or scrambled data. It only works optimally however if there is no correlation in the transmitted bit sequence.

Some communication standards, such as 10G Ethernet, scramble the data before transmission, resulting in the statistics of the transmitted bit sequence being close to truly random. This means that the probability of the polarity of each bit transmitted is independent of preceding and subsequent bits. However some other communication standards, such as Fibre Channel, use coding schemes which result in transmitted data which does not have random statistics. Fibre Channel uses 8B10B coding, where each 8 bits of data are used to generate a 10 bit code word. These code words achieve bounded disparity and guarantee a minimum number of transitions per code word to aid with clock recovery. 8B10B coding also uses reserved code words for control purposes such as framing data and indicating that the line is idle. Some of these control code words can be transmitted for an indefinite period. These features mean that the statistics of the data transmitted over Fibre Channel are not random. The probability that the next bit will be different to the current one is greater than 50% and certain bit sequences may be much more likely than others. If a control code word is transmitted continuously, certain bit sequences may not be present at all. There is therefore correlation between the current bit and surrounding bit sequence.

If there is no ISI present then all surrounding bit sequences are equally likely to cause a soft decision. If ISI is present then bit sequences which reduce the amplitude at the sampling point are more likely to cause soft decisions. All possible bit sequences are equally likely to occur in scrambled data. Therefore, once the ISI in the channel has been nulled, the rate at which soft decisions occur which increase a tap weight will be equal to the rate at which soft decisions occur which decrease the tap weight. Therefore, with random or scrambled data the algorithm described in U.S. Pat. No. 7,170,930 will converge to a steady state which minimises ISI.

If however there is correlation between bits, the steady state which the algorithm described in U.S. Pat. No. 7,170,930 will converge to will not minimise ISI. Simplistically, if ISI is effectively nulled and the data is random that any bit sequence may generate a soft decision. For each soft decision there is a 50% chance that the next bit say will be the same polarity and a 50% chance it will be of the opposite polarity. Thus the adjustments made to the weightings cancel out—and if a smoothing filter is used no change may be made to the weightings. However if the next bit, due to the nature of the data, has a 75% chance of being the opposite polarity then the weighting will be adjusted downwards three times more often that it is adjusted upwards. This can result in a downward trend for the weighting—which will in turn introduce ISI.

For data where there is correlation, then for the algorithm to reach a steady state there must be residual ISI in the equalised channel. For example, if there is a greater than 50% chance that the bit after the current bit has the opposite polarity, then negative polarity ISI must be introduced at the corresponding tap so that it becomes more likely that a soft decision will occur when the two bits have the same polarity. The greater the correlation between bits, the more ISI that will be introduced.

The method of the present invention avoids this failure mechanism and so enables correct adaptation for coding schemes such as 8B10B.

In this method, the weightings are adjusted when both hard and soft decisions occur. When a soft decision occurs, the weighting is increased if the polarity of the bit, for that weighting, is the same as the adjusted bit or decreased if the bit is of opposite polarity. When a hard decision occurs, the weighting is decreased if the bit, for that weighting, is of the same polarity as the adjusted bit signal and increased if the bit has the opposite polarity.

The method therefore comprises determining whether the polarity of the bits in the other bit periods matches the polarity of the current bit. For bit periods which precede the bit in question it will be clear that the polarity of the preceding bits will already have been determined. However for bit periods which are subsequent to the bit in question the polarity may not have been determined. Whilst it may be possible to separately compare the signal for each relevant bit period (from which there is a weighted contribution) with the slice threshold in order to determine the polarity of the bit, preferably the signal for each subsequent bit period is equalized, i.e. an adjusted bit signal is formed, prior to being compared to the slice threshold. Conveniently therefore the adjustment may be delayed until the subsequent bits have been equalized in turn. Once the polarity for a bit is determined it can be compared to the bit in question in order to determine the adjustment for the relevant bit period.

As a simple example consider that an equalizer comprises a 2-bit FFE and a 2-bit DFE. This means that for each bit in question an adjusted bit signal is formed using the signal from the current bit period and also weighted contributions from the two preceding and two subsequent bits. When bit x is being equalized an adjusted bit signal is therefore formed with weighted contributions from bits x+1, x+2, x−1 and x−2. The polarity of adjusted bit signal x is determined and a decision is made whether the bit is hard or soft. Suppose it as a soft 1. This means that the weightings for the other bit periods will be increased if the relevant bit is also a 1 but decreased if the relevant bit is a 0. The polarity of the preceding bits, x−1 and x−2 will already have been determined and thus an adjustment could be made to the weightings to the −1 and −2 bit periods at this point if desired. However the polarity of bits x+1 and x+2 is not known. The category of bit x is thus stored and the next bit, x+1, is equalized (with weighted contributions from bits x+2, x+3, x and x−1). The adjusted bit signal x+1 is then categorized and the result stored and then bit x+2 is equalized and categorized. At this point the value of all bits x+2 to x−2 is now known and the adjustments based on bit x can be made. For example, if bit x+2 was determined to be a 0 then the weighting for the +2 bit period would be decreased. Clearly the process would then move on to consider bit x+1 and wait until the polarities of bits x+3 to x−1 were known to make the relevant adjustments.

If the adjustment weights are chosen correctly, this algorithm converges to a steady state such that when any particular bit sequence within the tap range of the equaliser occurs, the probability of it causing a soft decision is constant. This results in the ISI within the tap range of the equaliser being nulled. The solution is not affected by correlation between bits and is therefore independent of the relative probabilities of different patterns occurring. Referring back to the previous example, if there is a greater than 50% chance that the bit after the current bit has the opposite polarity, this will make the rate at which soft decisions occur with opposite polarity greater than the rate at which they occur with the same polarity, but also affect the rates of hard decisions by the same proportion. The two effects may cancel out so that the tap weight is unaffected.

The magnitude of the first adjustment to the weighting for a particular bit period and the magnitude of the second adjustment to the weighting for that bit period may be weighted according to the proportion of soft bits in the bit sequence—or the proportion of hard bits. As each bit is determined to be hard or soft the proportion of soft bits is clearly linked to the proportion of hard bits.

The first adjustment may have a magnitude of $(1-k)*C$ and wherein the second adjustment has a magnitude of $k*C$ where k is the proportion of soft bits in the received data, i.e. in a 100 bits, $100*k$ bits will be soft and $(1-k)*100$ will be hard, and C is a constant for a particular bit period.

The constant C may be different for different bit periods, i.e. an adjustment to the weighting for the contribution from one bit period may use a different value of C to the adjustment to the weighting for the contribution from a different bit period. In some embodiments the however, the value of C may be the same for multiple bit periods. For instance if the equalizer has a FFE the same value, $C_1$ may be used to adjust the weightings of coefficients in the FFE. Similarly if the equalizers has a DFE a single value $C_2$ may be used to adjust the weightings of coefficients in the DFE. The value of $C_1$ and $C_2$ may be the same or different.

As described in U.S. Pat. No. 7,170,930 the level of the upper and low threshold may be adjusted in response to the decisions made so provide a predetermined proportion of hard/soft bits. Also as described in U.S. Pat. No. 7,170,930 the slice threshold may be set in response to the upper and lower thresholds.

The method may comprise combining weighted contributions from a plurality of other bit periods, which may includes at least one bit period from a bit received prior to said relevant bit period and/or at least one bit period from a bit received after said relevant bit period.

Some equalizer embodiments use interleaved sub sampled equaliser architectures. such as described in US patent publication 20050201455. In this style of implementation the input signal is sampled and passed through two separate delay lines and sets of quantisers, one sampling even bits and the other odd bits. The present invention also provides a method of equalizing a received data signal comprising dividing the received data signal into a plurality of separate signals and performing the method as described above on each data stream.

However another issue can arise for this type of architecture with non-random coding Whilst 8B10B coding minimises overall disparity in the transmitted data, there can be significant disparity in each of the subsampled bit patterns, particularly if a control word is transmitted continuously.

If the upper and lower thresholds are placed as described previously, such that a proportion $0.5+k/2$ of samples are below the upper threshold and $0.5-k/2$ samples are above the lower threshold, then if the ratio of 1s to 0s isn't 50% then the upper and lower thresholds won't settle equidistant about the ideal slicing threshold.

To solve this problem, a similar algorithm to that used for adjusting the tap weights can be used. The thresholds are placed such that a proportion k of 1s fall below the upper threshold and the same proportion of 0s fall above the lower threshold. If this is done then the position of the thresholds becomes independent of the DC balance of the bit sequence.

This behaviour may be achieved by controlling the upper and lower thresholds as follows:

If the received bit is a soft one, lower the upper threshold by an amount $(1-k)*D$.

If the received bit is a hard one, increase the upper threshold by an amount $k*D$.

If the received bit is a soft zero, increase the lower threshold by an amount $(1-k)*D$.

If the received bit is a hard zero, decrease the lower threshold by an amount $k*D$.

This example, of course, assumes that a polarity of 1 is above the slice threshold and a polarity of 0 below. It will be clear however that the general method would apply will a reversal of 1s and 0s.

In another aspect of the invention there is provided an equalizer comprising: a combination module for forming an adjusted bit signal based on the signal received for the relevant bit and at least one weighted contribution from another bit; and control logic configured to: compare the value of the adjusted bit signal to a slice threshold to determine the polarity of the adjusted bit; categorizing the bit as a hard bit if the adjusted bit has a signal value above an upper threshold or below a lower threshold and otherwise as a soft bit, wherein the upper threshold is above the slice threshold and the low threshold is below the slice threshold, and adjust the weighting for said at least one weighted contribution from another bit; wherein a first adjustment to a weighting is made if the adjusted bit is a soft bit and a second, different adjustment is made if the adjusted bit is a hard bit.

This aspect of the invention offers all the same advantages and can be used in all of the same embodiments as described above. In particular the first adjustment may comprise increasing the weighting of the contribution from any bit period for which the polarity of the relevant bit is determined to match the polarity of the adjusted bit signal and decreasing the weighting of the contribution from any bit period for which the polarity of the relevant bit is determined to be opposite to the polarity of the adjusted bit signal and the said second adjustment comprises decreasing the weighting of the contribution from any bit period for which the polarity of the relevant bit is determined to match the polarity of the adjusted bit signal and increasing the weighting of the contribution from any bit period for which the polarity of the relevant bit is determined to be opposite to the polarity of the adjusted bit signal. The first adjustment may have a magnitude of $(1-k)*C$ and the second adjustment a magnitude of $k*C$ where k is the proportion of soft bits in the received data and C is a constant for a particular bit period.

The combination module may comprise at least one tapped delay line, a gain multiplier for each tap and a summation block. The control logic may comprise a first comparator for comparing the adjusted bit signal to the slice threshold and may also comprise a second comparator for comparing the adjusted bit signal to the upper threshold and a third comparator for comparing the adjusted bit signal to the lower threshold. Of course the skilled person will realise that there are other ways of comparing the adjusted bit signal to the thresholds.

Alternatively the signal processing i.e. forming an adjusted bit signal and/or comparison with the thresholds, may be performed in the digital domain and the combination module may comprise digital processing circuitry for example. The equaliser may therefore additionally comprise an analogue to digital converter for converting the input signal to a digital signal.

The control logic may be configured to control the level of the upper and lower threshold so to maintain the proportion of bits characterized as soft bits at a predetermined level.

In general the present invention provides a method of adjusting the weightings of a decision feedback equalizer or a feed forward equalizer comprising the steps of:
determining the polarity of a bit in question with either a high confidence level or a low confidence level and,
when a low confidence bit is detected adjusting the weightings to increase the confidence level for that bit and
when a high confidence bit is detected adjusting the weightings to decrease the confidence level for that bit.

The invention will now be describe by way of example only with reference to the following drawings, of which:

Figure 1:
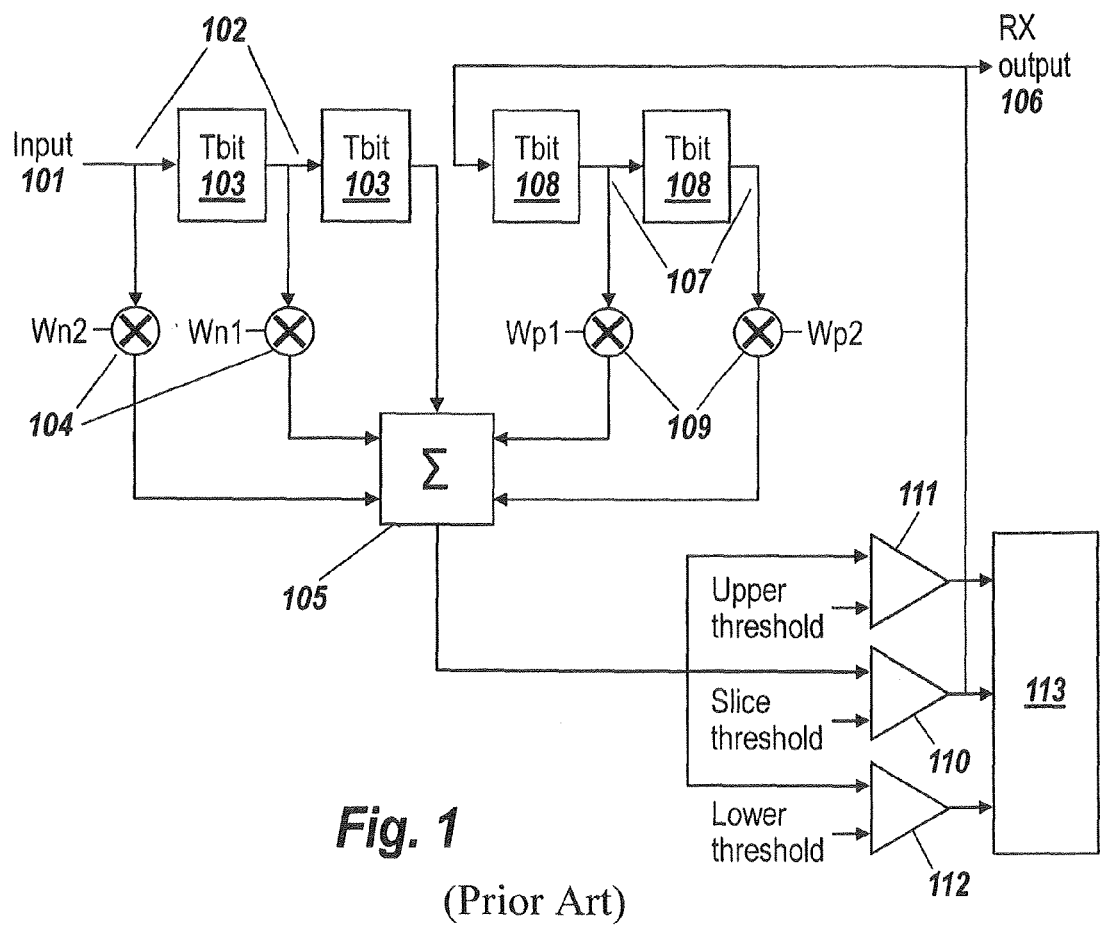
FIG. 1 illustrates a Feed Forward Equalizer/Decision Feedback Equalizer.

As mentioned above FIG. 1 illustrates a Feed Forward Equalizer/Decision Feedback Equalizer such as is described in U.S. Pat. No. 7,170,930. The present invention can be applied to such an equalizer and only requires a change to the operation of the control logic 113.

In operation the tapped delay line formed by taps 102 and delays 103 operate as previously describe and multipliers 104 apply a specified weighted gain. Similarly the tapped delay line formed by taps 107 and delays 108 together with multipliers 109 also operate as described previously.

The contribution from the bit period in question, and the weighted contributions are summed by summation block 105 to form an adjusted bit signal and which is passed to comparators 110, 111 and 112.

Figure 2:
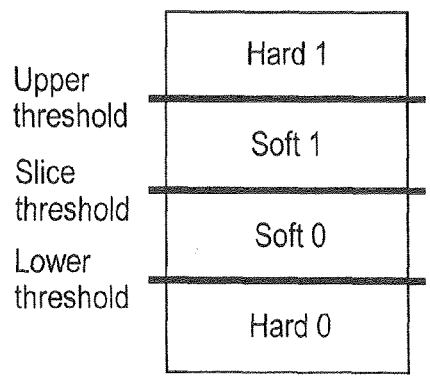
FIG. 2 illustrates the bits categorization.

The comparators compare the adjusted bit signal against a slice threshold and upper and lower threshold to categorize the bit as a hard 1, a soft 1, a hard 0 or a soft 0 as shown in FIG. 2.

The control logic 113 is however configured to adjust the FFE tap coefficients when both hard and soft decisions occur. When a soft decision occurs, the tap coefficient Wnx is increased by an amount $(1-k)*C$ if the polarity of bit x is the same as the current bit. It is decreased by the same amount if the bits have opposite polarities.

As above C is a constant that may be the same for all the weightings of the FFE. The value k is the proportion of bits that are soft. The proportion of bits that are soft is controlled by setting the levels of the upper and lower threshold. In one embodiment these thresholds are set such that, out of any number of samples, $0.5+k/2$ of the samples are below the upper threshold and $0.5-k/2$ of the samples are below the lower threshold.

When a hard decision occurs, the tap coefficient Wnx is decreased by an amount $k*C$ if the polarity of bit x is the same as the current bit. It is increased by the same amount if the bits have opposite polarities.

The same algorithm can be applied to adjust the DFE coefficients Wpx, with either the same or a different value for the constant C.

This algorithm converges to a steady state such that when any particular bit sequence within the tap range of the equaliser occurs, the probability of it causing a soft decision is k. This results in the ISI within the tap range of the equaliser being nulled. The solution is not affected by correlation between bits and is therefore independent of the relative probabilities of different patterns occurring. If there is a greater than 50% chance that the bit after the current bit has the opposite polarity, this will make the rate at which soft decisions occur with opposite polarity greater than the rate at which they occur with the same polarity, but also affect the rates of hard decisions by the same proportion. The two effects cancel out so that the tap weight is unaffected.

Figure 3:
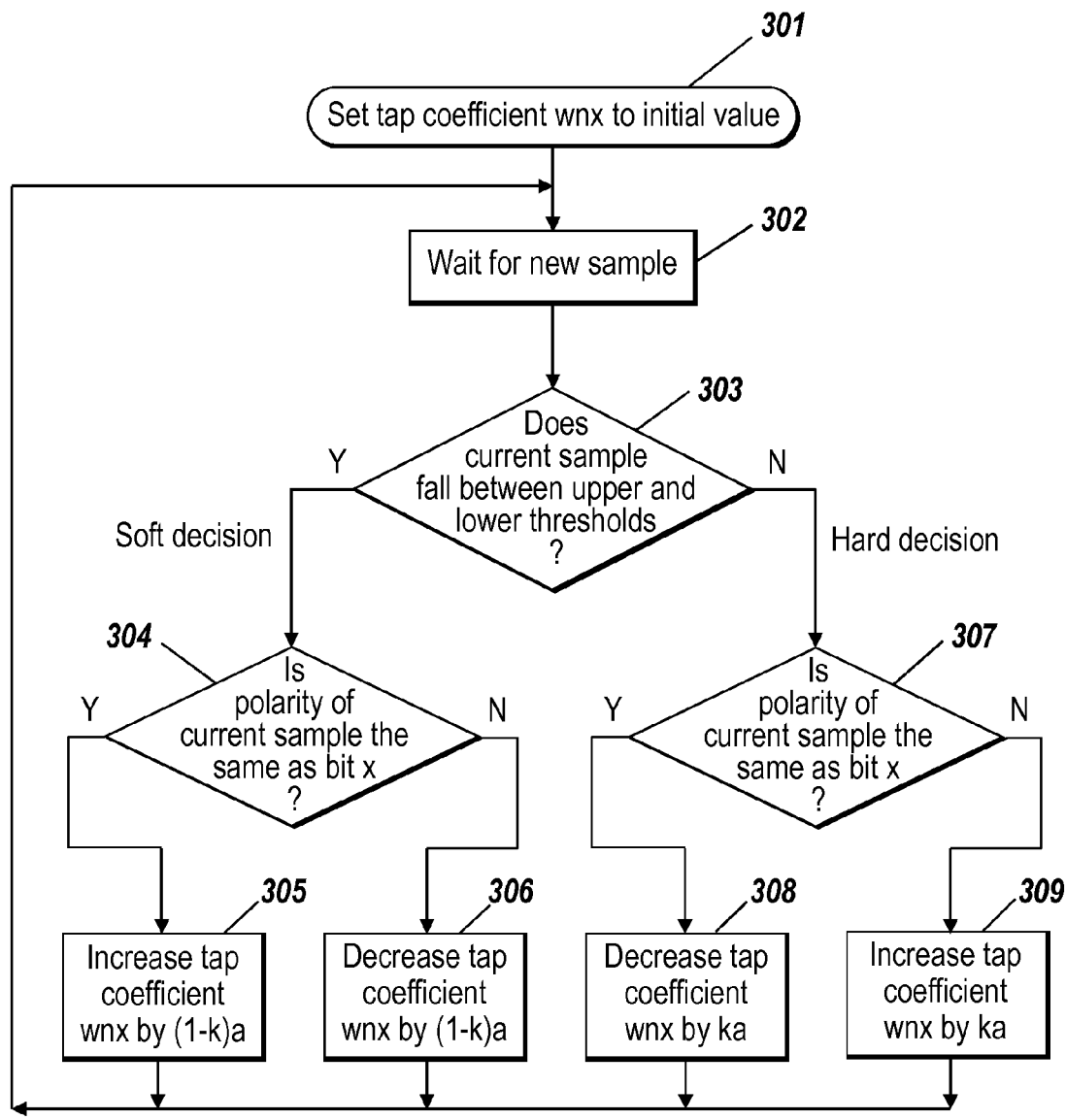
FIG. 3 illustrates a flow chart of the method of invention.

FIG. 3 illustrates a flow chart of the method of the present invention. The method starts with setting the tap coefficients to an initial value 301. The method then waits for a new sample 302. When a new sample is detected the adjusted bit signal is constructed based on the initial weighting and, at step 303, it is determined whether the sample falls within the upper and lower thresholds, i.e. it is a soft bit. If yes it is then determined at step 304, for each bit x, whether the polarity of bit x is the same as the adjusted bit signal. If yes the relevant tap coefficient is increased at step 305 by an amount equal to $(1-k)*C$. If not the tap coefficient is decreased, step 306, by an amount equal to $(1-k)*C$.

If however, at step 303, it is determined that the bit is a hard bit, then at step 307 it is determined whether, for each bit x, the adjusted bit signal is the same polarity as bit x. If yes, the tap coefficient is decreased by an amount equal to k*C in step 308. If bit x is of the opposite polarity the tap coefficient is increased, 309, by an amount equal to k*C.

Figure 4:
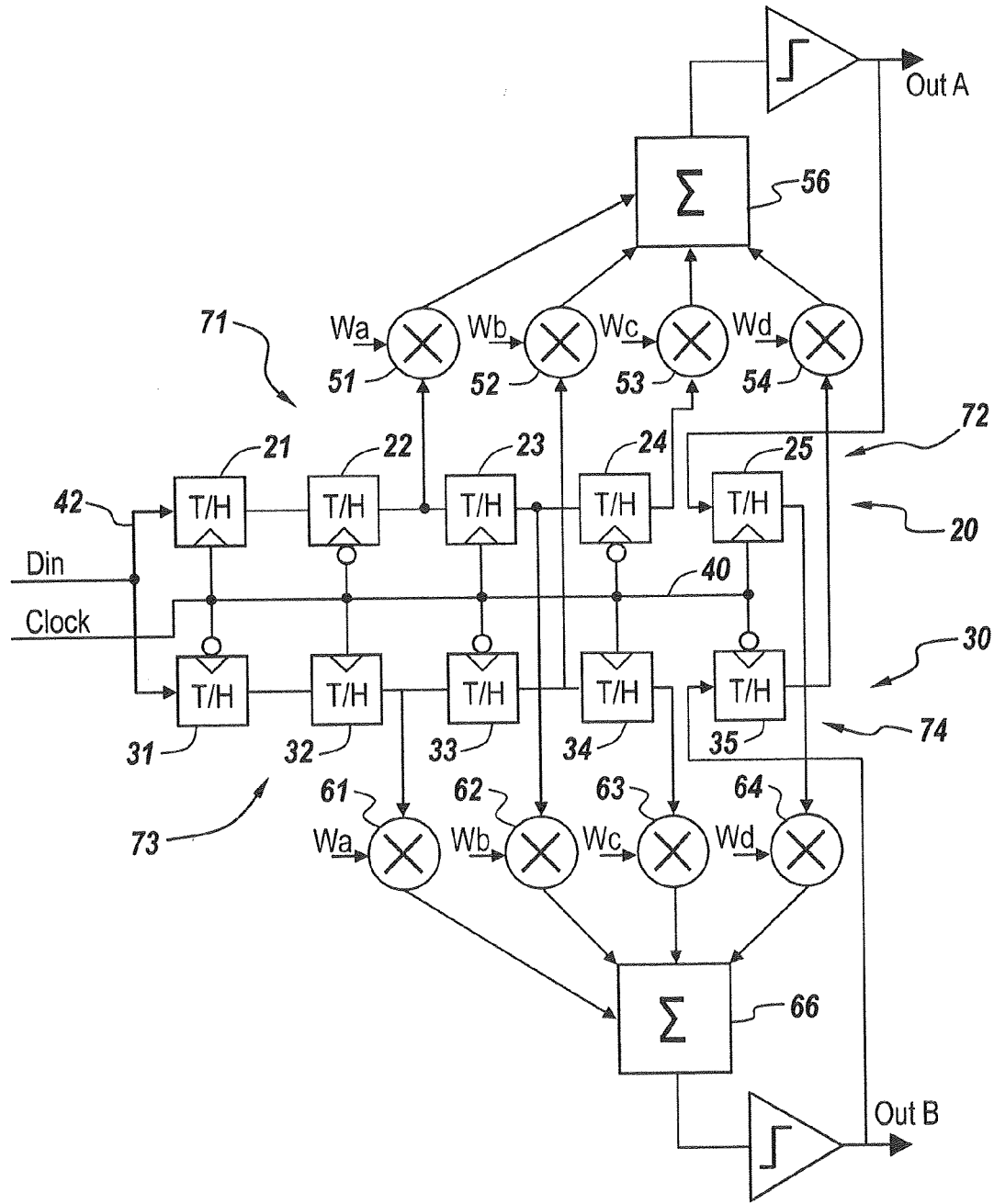
FIG. 4 illustrates a interleaved sub sampled equaliser.

Another issue with dealing with non random coding protocols such as 8B10B coding can occur if an interleaved sub sampled equaliser architecture is used, such as described in US patent 20050201455, and illustrated in FIG. 4. In this style of implementation the input signal is sampled and passed through two separate delay lines and sets of quantisers, one sampling even bits and the other odd bits. Whilst 8B10B coding minimises overall disparity in the transmitted data, there can be significant disparity in each of the subsampled bit patterns, particularly if a control word is transmitted continuously.

If the upper and lower thresholds are placed as described previously, such that a proportion 0.5+k/2 of samples are below the upper threshold and 0.5−k/2 samples are above the lower threshold, then if the ratio of 1s to 0s isn't 50% then the upper and lower thresholds won't settle equidistant about the ideal slicing threshold.

To solve this problem, a similar algorithm to that used for adjusting the tap weights can be used. The thresholds are placed such that a proportion k of 1s fall below the upper threshold and the same proportion of 0s fall above the lower threshold. If this is done then the position of the thresholds becomes independent of the DC balance of the bit sequence.

This behaviour may be achieved by controlling the upper and lower thresholds as follows, where D is an adjustment constant.

If the received bit is a soft one, lower the upper threshold by an amount (1−k)*D.

If the received bit is a hard one, increase the upper threshold by an amount k*D.

If the received bit is a soft zero, increase the lower threshold by an amount (1−k)*D.

If the received bit is a hard zero, decrease the lower threshold by an amount k*D.

The invention claimed is:

1. A method of equalizing a received data signal comprising a series of bits, the method comprising:
   forming an adjusted bit signal for a bit based on a signal received for a relevant bit period and at least one weighted contribution from another bit period;
   comparing the value of the adjusted bit signal to a slice threshold to determine a polarity of the adjusted bit;
   categorizing the adjusted bit as a hard bit if the adjusted bit has a signal value above an upper threshold or below a lower threshold and otherwise as a soft bit, wherein the upper threshold is above the slice threshold and the low threshold is below the slice threshold, and
   adjusting the weighting for said at least one weighted contribution from another bit period;
   wherein a first adjustment to the weighting is made if the adjusted bit signal is categorized as a soft bit and a second, different adjustment is made if the adjusted bit signal is categorized as a hard bit;
   wherein said first adjustment comprises increasing the weighting of the contribution from the another bit period for which the polarity of the relevant bit is determined to match the polarity of the adjusted bit signal and decreasing the weighting of the contribution from the another bit period for which the polarity of the relevant bit is determined to be opposite to the polarity of the adjusted bit signal; and
   wherein said second adjustment comprises decreasing the weighting of the contribution from the another bit period for which the polarity of the relevant bit is determined to match the polarity of the adjusted bit signal and increasing the weighting of the contribution from the another bit period for which the polarity of the relevant bit is determined to be opposite to the polarity of the adjusted bit signal.

2. A method as claimed in claim 1 wherein a magnitude of the first adjustment to the weighting for a particular bit period and a magnitude of the second adjustment to the weighting for that bit period are weighted according to a proportion of hard and soft bits in the received data signal.

3. A method as claimed in claim 1 wherein the first adjustment has a magnitude of (1−k)*C and wherein the second adjustment has a magnitude of k*C where k is the proportion of soft bits in the received data signal and C is a constant for a particular bit period.

4. A method as claimed in claim 1 wherein a level of the upper threshold and lower threshold are adjusted to provide a predetermined proportion of hard and soft bits.

5. A method as claimed in claim 1 wherein forming said adjusted bit signal comprises combining weighted contributions from a plurality of other bit periods.

6. A method as claimed in claim 5 wherein said weighted contributions from a plurality of other bit periods includes at least one bit period from a bit received prior to said relevant bit period.

7. A method as claimed in claim 5 wherein said weighted contributions from a plurality of other bit periods includes at least one bit period from a bit received after said relevant bit period.

8. A method of equalizing a received data signal comprising a series of bits, the method comprising:
   forming an adjusted bit signal for a bit based on a signal received for a relevant bit period and at least one weighted contribution from another bit period;
   comparing the value of the adjusted bit signal to a slice threshold to determine a of the adjusted bit;
   categorizing the adjusted bit as a hard bit if the adjusted bit has a signal value above an upper threshold or below a lower threshold and otherwise as a soft bit, wherein the upper threshold is above the slice threshold and the low threshold is below the slice threshold, and
   adjusting the weighting for said at least one weighted contribution from another bit period; wherein a first adjustment to the weighting is made if the adjusted bit signal is categorized as a soft bit and a second, different adjustment is made if the adjusted bit signal is categorized as a hard bit;
   increasing the upper threshold by a first amount if the adjusted bit signal is above the upper threshold;
   decreasing the upper threshold by a second amount if the adjusted bit signal is between the upper threshold and the slice threshold;
   increasing the lower threshold by said second amount if the adjusted bit signal is between the slice threshold and the lower threshold; and
   decreasing the lower threshold by said first amount if the adjusted bit signal is below the lower threshold;
   wherein said first amount has a magnitude of k*D and wherein the second amount has a magnitude of (1−k)*D where k is a proportion of soft bits desired in the received data and D is a constant.

9. An equalizer comprising;
   a combination module for forming an adjusted bit signal based on a signal received for a relevant bit and at least one weighted contribution from another bit; and
   control logic configured to:

compare the value of the adjusted bit signal to a slice threshold to determine the polarity of the adjusted bit;

categorizing the adjusted bit as a hard bit if the adjusted bit has a signal value above an upper threshold or below a lower threshold and otherwise as a soft bit, wherein the upper threshold is above the slice threshold and the low threshold is below the slice threshold, and adjust the weighting for said at least one weighted contribution from another bit;

wherein a first adjustment to the weighting is made if the adjusted bit is a soft bit and a second, different adjustment is made if the adjusted bit is a hard bit;

wherein said first adjustment comprises increasing the weighting of the contribution from the another bit period for which the polarity of the relevant bit is determined to match the polarity of the adjusted bit signal and decreasing the weighting of the contribution from the another bit period for which the polarity of the relevant bit is determined to be opposite to the polarity of the adjusted bit signal; and wherein said second adjustment comprises decreasing the weighting of the contribution from the another bit period for which the polarity of the relevant bit is determined to match the polarity of the adjusted bit signal and increasing the weighting of the contribution from the another bit period for which the polarity of the relevant bit is determined to be opposite to the polarity of the adjusted bit signal.

10. An equalizer as claimed in claim 9 wherein the first adjustment has a magnitude of $(1-k)*C$ and wherein the second adjustment has a magnitude of $k*C$ where k is the proportion of soft bits in the received data and C is a constant for a particular bit period.

11. An equalizer as claimed in claim 9 wherein said combination module comprises at least one tapped delay line, a gain multiplier for the at least one tapped delay line and a summation block.

12. An equalizer as claimed in claim 9 wherein said control logic comprises a first comparator for comparing the adjusted bit signal to the slice threshold.

13. An equalizer as claimed in claim 12 wherein said control logic further comprises a second comparator for comparing the adjusted bit signal to the upper threshold and a third comparator for comparing the adjusted bit signal to the lower threshold.

14. An equalizer as claimed in claim 9 wherein the control logic is configured to control the level of the upper and lower threshold so to maintain the proportion of bits characterized as soft bits at a predetermined level.

15. An equalizer as claimed in claim 9 wherein the control logic is configured to:

increasing the upper threshold by a first amount if the adjusted bit signal is above the upper threshold;

decreasing the upper threshold by a second amount if the adjusted bit signal is between the upper threshold and the slice threshold;

increasing the lower threshold by said second amount if the adjusted bit signal is between the slice threshold and the lower threshold; and decreasing the lower threshold by said first amount if the adjusted bit signal is below the lower threshold.

* * * * *